United States Patent
Mate et al.

(10) Patent No.: US 10,259,493 B2
(45) Date of Patent: Apr. 16, 2019

(54) EMERGENCY STEERING PUMP SYSTEM FOR A MACHINE

(71) Applicant: Caterpillar Inc., Peoria, IL (US)

(72) Inventors: Edward William Mate, Manhattan, IL (US); David Mork, Yorkville, IL (US); Steven Edward Johnson, Washington, IL (US)

(73) Assignee: Caterpillar Inc., Deerfield, IL (US)

( * ) Notice: Subject to any disclaimer, the term of this patent is extended or adjusted under 35 U.S.C. 154(b) by 122 days.

(21) Appl. No.: 15/373,558

(22) Filed: Dec. 9, 2016

(65) Prior Publication Data
US 2018/0162441 A1   Jun. 14, 2018

(51) Int. Cl.
*B62D 5/30* (2006.01)
*B62D 5/065* (2006.01)

(52) U.S. Cl.
CPC .............. *B62D 5/30* (2013.01); *B62D 5/065* (2013.01)

(58) Field of Classification Search
CPC .................................. B62D 5/30; B62D 5/065
USPC ........................................................ 180/406
See application file for complete search history.

(56) References Cited

U.S. PATENT DOCUMENTS

| | | | |
|---|---|---|---|
| 3,987,626 A * | 10/1976 | Bianchetta | F16H 61/42 180/6.48 |
| 4,142,842 A * | 3/1979 | Hicks | B62D 5/32 417/288 |
| 4,345,660 A | 8/1982 | Miller | |
| 4,586,332 A * | 5/1986 | Schexnayder | E02F 9/123 60/468 |
| 7,770,687 B2 * | 8/2010 | Entwistle | B62D 5/091 180/403 |
| 7,837,001 B2 * | 11/2010 | Young | B62D 5/093 180/441 |
| 8,447,458 B2 | 5/2013 | Grochowski et al. | |
| 2013/0284532 A1* | 10/2013 | McVey | B62D 5/30 180/403 |
| 2013/0291714 A1* | 11/2013 | Wu | F15B 1/021 91/471 |
| 2014/0129035 A1* | 5/2014 | Marquette | B62D 5/075 700/282 |
| 2015/0021116 A1* | 1/2015 | Young | B62D 5/093 180/406 |

(Continued)

FOREIGN PATENT DOCUMENTS

DE   10159716   11/2003

*Primary Examiner* — Jacob D Knutson
(74) *Attorney, Agent, or Firm* — William R. Tinker; Harrity & Harrity LLP

(57) ABSTRACT

An emergency steering pump system for a primary pump providing a standby pressure via a primary output line includes a load sense line that is configured to branch-off from the primary output line. The load sense line has a first orifice disposed therein. A secondary pump is included for providing a margin pressure via a secondary output line that is coupled to the primary output line at a point downstream of the load sense line. A communication line is coupled to the primary output line at a point upstream of the load sense line. The communication line has a pressure control mechanism disposed therein. An output of the pressure control mechanism is coupled with an unloader valve of the secondary pump such that the pressure control mechanism is configured to bring about the margin pressure from the secondary pump.

20 Claims, 5 Drawing Sheets

(56) References Cited

U.S. PATENT DOCUMENTS

2015/0198507 A1* 7/2015 Mork .................... G01M 17/06
　　　　　　　　　　　　　　　　　　　701/34.4

* cited by examiner ated at machine startup to ensure proper functionality of the emergency system. In a typical operational readiness test, the emergency steering pump is briefly activated to determine if the resulting pressure supplied by a secondary pump is sufficient to take over the steering system if necessary. Correspondingly, the typical emergency steering mechanism requires means to rapidly accumulate pressure within a relatively short period of time.

EMERGENCY STEERING PUMP SYSTEM FOR A MACHINE

TECHNICAL FIELD

The present disclosure relates to relates generally to emergency steering pump systems for a machine, and more particularly, to emergency steering pump systems that provide rapid pressure accumulation required for providing backup power in operation while also facilitating a testing of the emergency steering pump systems for their operational readiness during startup condition of a machine.

BACKGROUND

Steering pumps are commonly used in the relevant art, for instance, to facilitate a machine operator's ability to steer, maneuver or otherwise control vehicles, work machines, and the like. As a safety feature, some machines are integrated with emergency steering mechanisms which provide an alternative or a secondary power source designed to supply backup power to the steering pump in emergency situations. Such emergency steering systems enable the operator to maintain control of the machine or vehicle in the event of a failure in a primary pump, such as due to leakage, a pump malfunction, or the like.

Emergency steering mechanisms are also further implemented with an operational readiness test or feature that is automatically performed at machine startup to ensure proper functionality of the emergency system. In a typical operational readiness test, the emergency steering pump is briefly activated to determine if the resulting pressure supplied by a secondary pump is sufficient to take over the steering system if necessary. Correspondingly, the typical emergency steering mechanism requires means to rapidly accumulate pressure within a relatively short period of time.

Conventional systems with electrically driven emergency steering mechanisms rely on steering pumps with a fixed pressure relief valve adapted to provide rapid pressure accumulation that is sufficient for not only the operational readiness tests at startup but also for actual emergency conditions. However, such systems accumulate pressure irrespective to the overall system or demands thereof and force the emergency pump to operate at maximum relief. Due to the high levels of pressure involved and the time required to reach threshold pressures, these assemblies are prone to premature failure such as overheating conditions in the electric motor and/or associated motor relays.

Also used in the art are unloader-type steering pumps which allow the emergency pump to build pressure based on system demand, and thereby reduce premature failures commonly associated with pumps using fixed pressure relief valves. Unloader-type steering pumps provide some advantages, but unlike an emergency pump using a fixed relief valve, an unloader-type emergency steering pump alone may not provide the output pressure needed for differentiation over the primary pump standby pressure required to satisfy the operational readiness test.

The present disclosure is directed at addressing one or more of the deficiencies set forth above. However, it should be appreciated that the solution of any particular problem is not a limitation on the scope of this disclosure or of the attached claims except to the extent expressly noted. Additionally, the inclusion of any problem or solution in this Background section is not an indication that the problem or solution represents known prior art except as otherwise expressly noted.

SUMMARY OF THE DISCLOSURE

In one aspect, the present disclosure discloses an emergency steering pump system for a primary pump in which the primary pump provides a standby pressure via a primary output line. The emergency steering pump system includes a load sense line that is configured to branch-off from a point located partway along a length of the primary output line. The load sense line has a first orifice disposed therein. The emergency steering pump system further includes a secondary pump for providing a margin pressure. The secondary pump has a secondary output line coupled to the primary output line at a point downstream of the load sense line. The emergency steering pump system also includes a communication line coupled to the load sense line and the primary output line at a point upstream of the load sense line. The communication line has a pressure control mechanism whose output is coupled with an unloader valve of the secondary pump such that the pressure control mechanism is configured to co-operatively bring about the margin pressure from the secondary pump.

In another aspect, the present disclosure discloses an emergency steering pump system for a primary pump in which the primary pump provides a standby pressure via a primary output line. The emergency steering pump system includes a load sense line that is configured to branch-off from a point located partway along a length of the primary output line. The load sense line has a first orifice disposed therein. The emergency steering pump system further includes a secondary pump for providing a margin pressure. The secondary pump has a secondary output line coupled to the primary output line at a point upstream of the load sense line. The emergency steering pump system also includes a communication line that is coupled to the primary output line at a point upstream of the load sense line. The communication line has a pressure control mechanism disposed therein such that an input of the pressure control mechanism is coupled with an unloader valve of the secondary pump. The first orifice and the pressure control mechanism are configured to co-operatively bring about the margin pressure from the secondary pump.

In yet another aspect, the present disclosure discloses an emergency steering pump system for a primary pump in which the primary pump provides a standby pressure via a primary output line. The emergency steering pump system includes a load sense line that is configured to branch-off from a point located partway along a length of the primary output line. The load sense line has a first orifice disposed therein. The emergency steering pump system further includes a secondary pump for providing a margin pressure via a secondary output line that is coupled to the primary output line at a point downstream of the load sense line. The emergency steering pump system also includes a communication line that is coupled to the load sense line. The communication line has a pressure control mechanism disposed therein such that an input of the pressure control mechanism is fluidly coupled to the secondary output line at a point located downstream of an unloader valve associated with the secondary pump. Further, the input of the pressure control mechanism is provided with a second orifice such that the pressure control mechanism is facilitated to co-operate with the first and second orifices for bringing about the margin pressure from the secondary pump in which a setting of an unloader valve associated with the secondary pump is selected to provide the margin pressure relative to the setting on the primary pump.

Other features and aspects of this disclosure will be apparent from the following description and the accompanying drawings.

DETAILED DESCRIPTION

Reference will now be made in detail to specific aspects or features, examples of which are illustrated in the accompanying drawings. Wherever possible, corresponding or similar reference numbers will be used throughout the drawings to refer to the same or corresponding parts.

Figure 1:
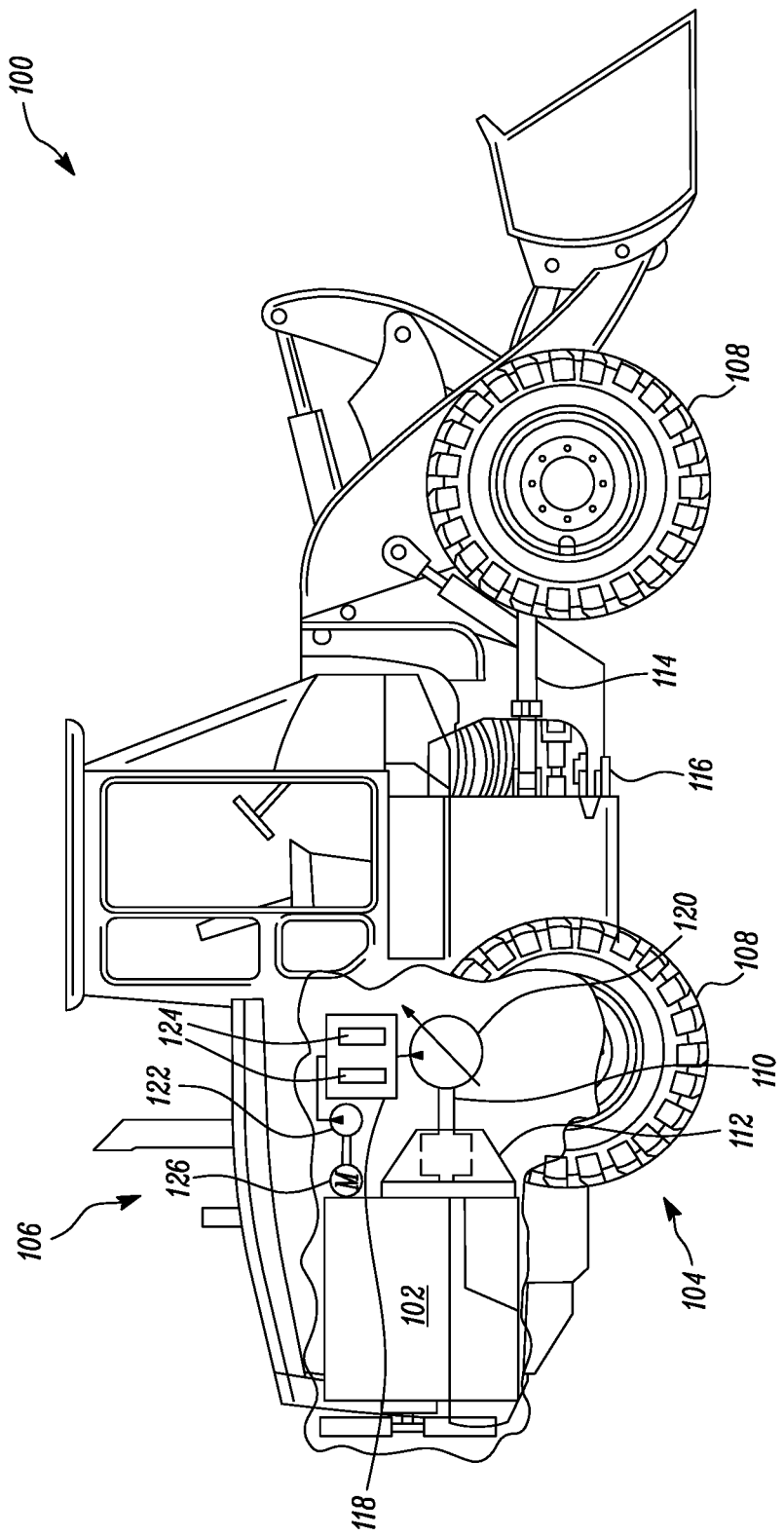
FIG. 1 is a diagrammatic view of one embodiment of a work machine having an emergency steering pump system of the present disclosure incorporated therewith.

Referring to FIG. 1, one embodiment of a work machine 100 is provided according to one embodiment of the present disclosure. As shown in FIG. 1, the work machine 100 may generally include, among other things, a power source 102, traction devices 104 and a steering system 106 for steering the traction devices 104 and the associated work machine 100. It should be understood that the work machine 100 may embody any mobile machine that performs some type of operation associated with an industry such as mining, construction, farming, or any other industry known in the art. For example, the work machine 100 may be an earthmoving machine such as a wheel loader, a dump truck, a backhoe, a motor grader, or any other suitable operation-performing machine. Moreover, the embodiments disclosed herein may be implemented in any hydro-mechanical machine in which an automatic and/or manual health check is to be run on an unloader-type backup pump that requires differentiation from a primary pump pressure within the same hydraulic circuit.

The power source 102 may be an engine such as, for example, a diesel engine, a gasoline engine, a gaseous fuel powered engine such as a natural gas engine, or any other engine apparent to one skilled in the art. The power source 102 may also embody another source of power such as a fuel cell, a power storage device, or any other source of power known in the art. The traction devices 104 may include wheels 108, for example, located on each side of the work machine 100. Alternatively, the traction devices 104 may include tracks, belts or other traction devices. In other embodiments, the fraction devices 104 may incorporate a differential gear assembly configured to divide power from the power source 102 between the wheels 108 located on either side of the work machine 100. For instance, the differential gear assembly may allow the wheels 108 on one side of the work machine 100 to turn faster than the wheels 108 located on an opposite side of the work machine 100.

As illustrated in FIG. 1, the steering system 106 may be coupled to the power source 102 via an input shaft 110 through a torque converter 112. Alternatively, the steering system 106 may be coupled to the power source 102 via a gear box (not shown), connected directly to the power source 102, or connected to the power source 102 in any other manner known in the art. As shown, one or more steering cylinders 114 may also be located on each side of the work machine 100 and configured to function in cooperation with a centrally-located articulated joint 116. To affect steering, the steering cylinder 114 located on one side of the work machine 100 may extend while the steering cylinder 114 located on the opposite side of the work machine 100 simultaneously retracts, thereby causing a forward end of the work machine 100 to pivot about the articulated joint 116 relative to a back end of the work machine 100. It should be noted that the number of the steering cylinders 114, as well as the configuration and connection of the steering cylinders 114 in the work machine 100 may vary.

The extension and retraction of the steering cylinder 114 may be accomplished by creating an imbalance of force on a piston assembly (not shown) disposed within a tube of the steering cylinder 114. In one embodiment, each of the steering cylinders 114 may include a first chamber and a second chamber separated by the piston assembly. The piston assembly may include a piston axially aligned with and disposed within the tube. The piston may include two opposing hydraulic surfaces, one associated with each of the first and second chambers. The first and second chambers may be selectively supplied with a pressurized fluid and drained of the pressurized fluid to create an imbalance of force on the two surfaces that causes the piston assembly to axially move within the tube. For example, a fluid pressure within the first hydraulic chamber acting on a first hydraulic surface being greater than a fluid pressure within the second hydraulic chamber acting on a second opposing hydraulic surface may cause the piston assembly to displace and increase the effective length of steering cylinder 114. Similarly, when fluid pressure acting on the second hydraulic surface is greater than fluid pressure acting on the first hydraulic surface, the piston assembly may retract within the tube to decrease the effective length of steering cylinder 114.

Still referring to FIG. 1, the steering system 106 may include a steering control unit 118 as well as a primary source of pressurized fluid or primary pump 120. As shown, the steering system 106 may also incorporate a secondary source of pressurized fluid or secondary pump 122 that is disposed in fluid communication with the steering control unit 118. The steering control unit 118 may be in fluid communication with the steering cylinder 114 and configured to control actuation of the steering cylinder 114. In particular, the steering control unit 118 may generally include one or more steering valves 124, such as one or more solenoids actuated against spring biases, or any other directional valve mechanisms that function to meter pressurized fluid into the steering cylinder 114. In other embodiments, the steering control unit 118 may be hydraulically actuated, mechanically actuated, pneumatically actuated, or actuated in any other suitable manner. The movement of the steering control unit 118 may control the flow of the pressurized fluid into and/or out of the steering cylinders 114. It should be understood that although only one steering control unit 118 is depicted in the accompanied figures, the steering system 106 may include additional steering control units 118 to be associated with each of the steering cylinders 114.

In one embodiment, the primary pump 120 may be a fixed displacement pump, a variable displacement pump, a variable flow pump, or any other source of pressurized fluid known in the art. The primary pump 120 may be configured to provide a flow of pressurized fluid in the steering system 106. The primary pump 120 may be operatively coupled to an output of the power source 102, for example, via a countershaft, a belt, an electrical circuit, or any other suitable manner. It should be noted that the primary pump 120 may also supply the pressurized fluid to other circuits in the work machine 100. The secondary pump 122 may include a ground-driven pump, an accumulator, or an electrically-driven unloader-type pump. For example, the secondary source pump 122 may be driven by an electric motor 126 coupled thereto. The electric motor 126 may be an AC drive motor or a DC drive motor, depending on specific requirements of an application.

Figure 2:
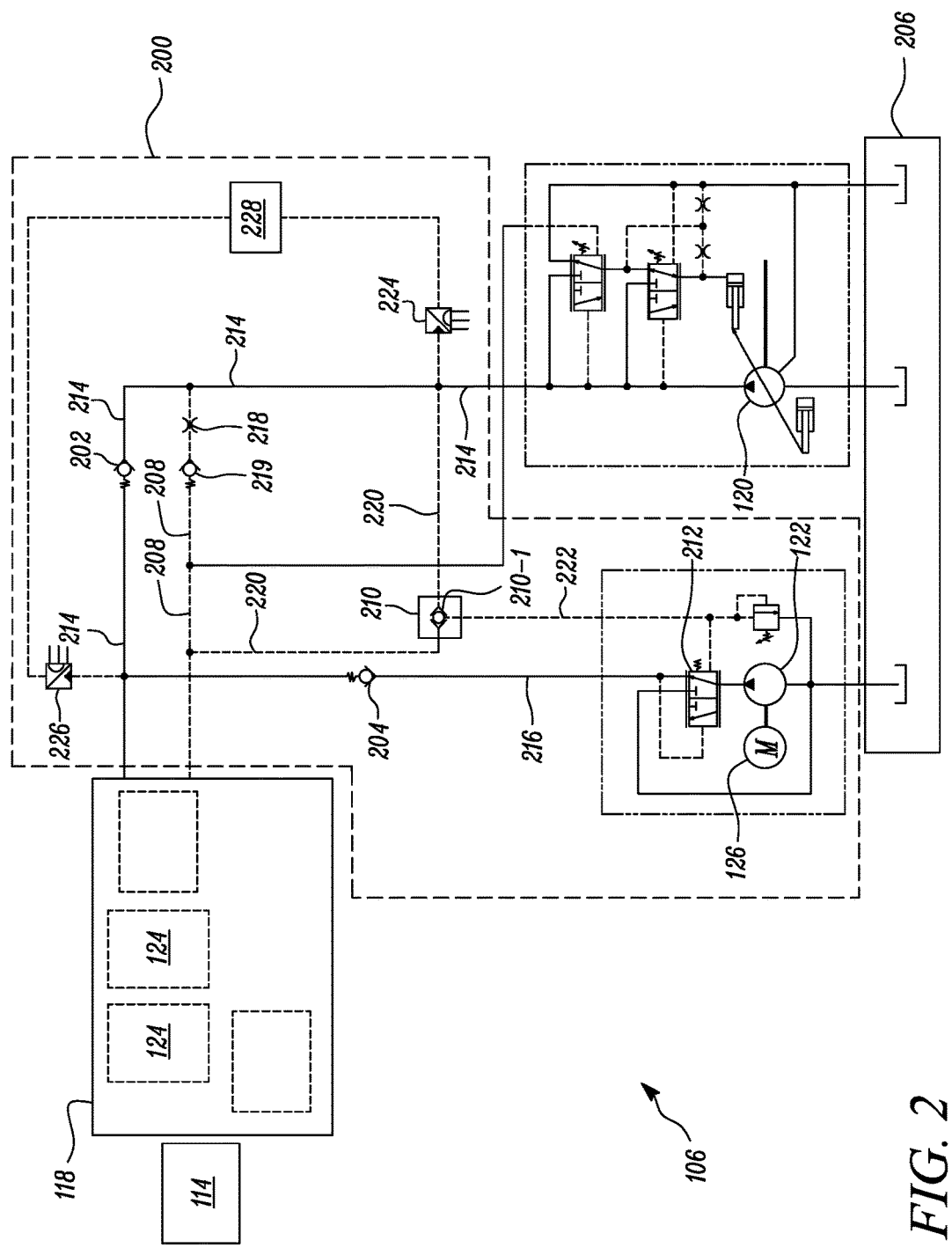
FIG. 2 is a schematic view of one embodiment of a steering system for a work machine having an emergency steering pump system of the present disclosure incorporated therewith.

Referring to FIG. 2, one example embodiment of an emergency steering pump system 200 is provided in conjunction with the steering system 106. As shown, the emergency steering pump system 200 may generally provide or be implemented with the primary pump 120 and the secondary pump 122, both of which may be in fluid communication with the steering control unit 118.

Also, in this embodiment, a first check valve 202 and a second check valve 204 may be disposed within a primary output line 214 and a secondary output line 216 associated with the primary pump 120 and the secondary pump 122 respectively. The first and second check valves 202 and 204 ensure one-directional flow of the pressurized fluid from the primary pump 120 and the secondary pump 122, respectively, towards the steering control unit 118, and also prevent back-flow of the pressurized fluid from any one of the primary pump 120 and the secondary pump 122 to the other, Moreover, one or more of the steering control unit 118, the primary pump 120 and the secondary pump 122 may also communicate with a sump or tank 206 to allow drainage of the pressurized fluid in the steering system 106.

In embodiments of this disclosure, it has been contemplated that the primary pump 120 is configured to provide a standby pressure via the primary output line 214 while the secondary pump 122 is configured to provide a discharge pressure via the secondary output line 216. Upon startup of the work machine 100, the primary pump 120 of FIG. 2 may operate to provide the standby pressure at a margin i.e., a pressure differential above the load demand via a load sense line 208. The secondary pump 122 may also operate to provide a margin pressure i.e., a pressure differential above the pressure signal in the fluid line 222. More particularly, the primary pump 120 may sense the load demand from the steering system 106 via a load sense line 208, for instance, carrying a load sense signal, or the like, that is indicative of the load demand corresponding to the given steering input. The load sense signal may further be communicated to the secondary pump 122 via a pressure control mechanism 210. The secondary pump 122 may be an unloader-type pump, or provided with an actuatable unloader valve 212 configured to adjust a discharge pressure of the secondary pump 122 based on the pressure as indicated, for example, in fluid line 222 via a resolver 210-1 shown in FIGS. 2-3, or the like. In alternative embodiments, the pressure control mechanism 210 may employ a check valve 210-2 as shown in FIG. 4, or the like. For the sake of differentiation with other like components in this disclosure, it should be noted that the check valve 210-2 will hereinafter be referred to as 'the fourth spring-loaded check valve' or simply 'the fourth check valve' and designated with identical numeral '210-2'.

Turning back to FIG. 2, the load sense line 208 is configured to branch-off from a point located partway along a length of the primary output line 214. The load sense line 208 has a first orifice 218 and a spring-loaded check valve 219 disposed therein. For the sake of differentiation, the spring-loaded check valve 219 will hereinafter be referred to as 'the third spring-loaded check valve' or simply 'the third check valve' and designated with identical numeral '219'. Further, as shown in FIG. 2, the secondary output line 216 is coupled to the primary output line 214 at a point downstream of the load sense line 208. The emergency steering pump system 200 also includes a communication line 220 that is coupled to the primary output line 214 at a point upstream of the load sense line 208. The pressure control mechanism 210 is disposed in the communication line 220 and the load sense line 208 such that an output 222 of the pressure control mechanism 210 is coupled with the unloader valve 212 of the secondary pump 122.

As disclosed earlier herein, in the illustrated embodiment of FIG. 2, the pressure control mechanism 210 includes the resolver 210-1. The pressure control mechanism 210 may be configured with a resolver 210-1 such that, irrespective of the standby pressure of the primary pump 120, the secondary pump 122 enables the emergency steering pump system 200 to consistently supply a cumulative pressure approximately equal to the sum of the standby pressure from the primary pump 120 and the margin pressure from the secondary pump 122 while both the primary pump 120 and the secondary pump 122 are operational for the purposes of the readiness test disclosed herein. Also, in the embodiments of FIGS. 2-3, it has been contemplated that the pressure control mechanism 210 is configured to co-operatively bring about the margin pressure from the secondary pump 122 based on the load demand on the steering system 106 when the primary pump 120 is not functional.

In alternative embodiments, the pressure control mechanism 210 may employ the check valve configuration 210-2 shown in FIG. 4, for instance, by providing the fourth spring-loaded check valve 210-2 upstream of the steering control unit 118 i.e., in the communication line 220. While the emergency steering pump system 200 of FIG. 4 produces an output pressure that is not dependent on the primary standby pressure, the required margin pressure above the primary standby pressure is attained based on a selection of the pressure setting associated with the unloader valve 212.

Figure 3:
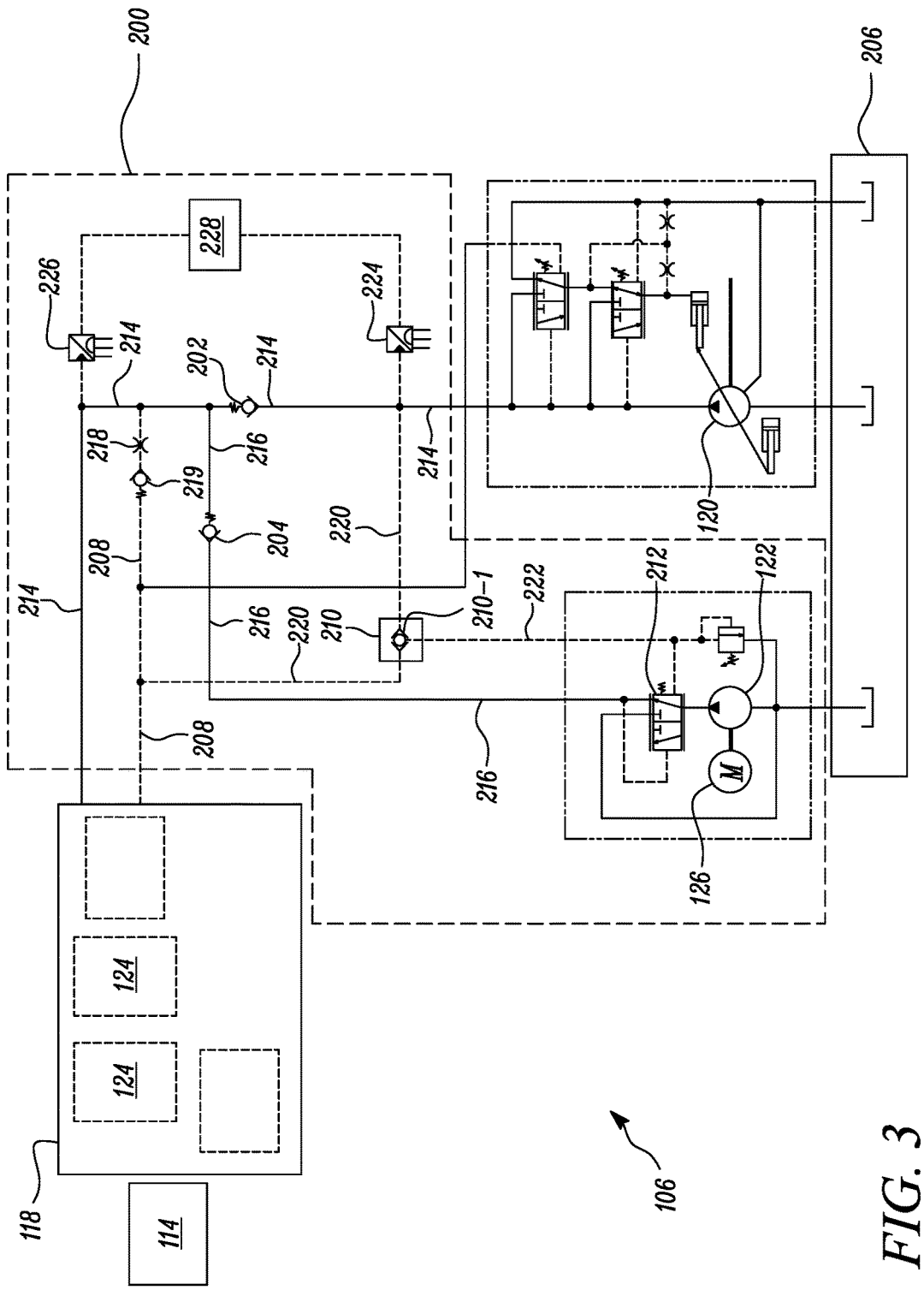
FIG. 3 is a schematic view of another embodiment of a steering system for a work machine having an emergency steering pump system.
Figure 4:
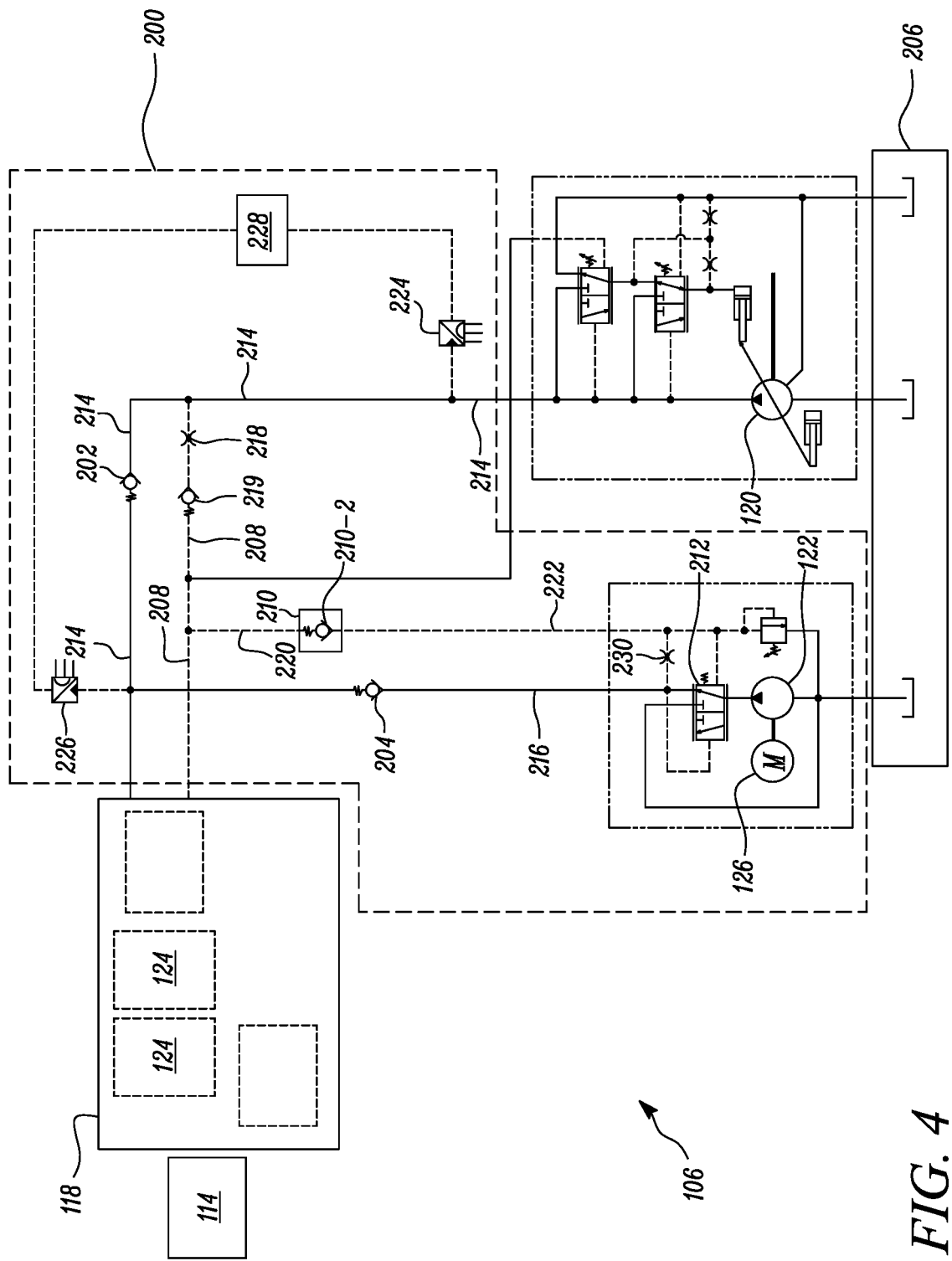
FIG. 4 is a schematic view of yet another embodiment of a steeling system for a work machine having an emergency steering pump system.

Furthermore, the emergency steering pump systems 200 of FIGS. 2-4 may also include at least two pressure sensors. As shown in the illustrated embodiment of FIG. 2, the emergency steering system 200 includes a first pressure sensor 224 that is disposed in the primary output line 214 and located at a point in the primary output line 214 upstream of the load sense line 208. The first pressure sensor 224 may be configured to measure the discharge pressure of fluid that is output by the primary pump 120. The emergency steering system 200 further includes a second pressure sensor 226 that is disposed in the primary output line 214 and located at a point in the primary output line 214 downstream of the secondary output line 216. In this location, the second pressure sensor 226 may be configured to measure the discharge pressure of one or both of the primary pump 120 and the secondary pump 122 depending on the operational state of the check valve 202. Alternatively, a differential pressure sensor (not shown) may be substituted for the two pressure sensors 224, 226 disclosed herein.

The emergency steering system 200 also includes a controller 228 that is disposed in communication with each of the first and second pressure sensors 224, 226. The controller 228 may be implemented using any one or more of a processor, a microprocessor, a microcontroller, an electronic control module (ECM), an electronic control unit (ECU), or any other suitable means for performing one or more operations for determining the operational status or readiness of the secondary pump 122 and/or the emergency steering pump system 200. Numerous commercially available means can be used to perform the functions of the controller 228. The controller 228 may also perform other functions not described herein. The controller 228 may additionally include, or be able to otherwise communicate with, a memory, a secondary storage device, other controllers or components associated with the work machine 100. Moreover, depending on the application, various other circuits may be associated with the controller 228 such as power supply circuitry, signal conditioning circuitry, solenoid driver circuitry, and the like.

In embodiments disclosed herein, the controller 228, upon start-up, would be configured to engage the secondary pump 122 for a pre-defined duration, monitor a cumulative pressure of the primary and secondary pumps 120 and 122 with the help of the pressure sensor 226, and determine readiness of the secondary pump 122 based on the pressure difference between the first and second pressure sensors 224 and 226 as compared to a pre-defined threshold. The controller 228 designates the readiness of the secondary pump 122 as successful if the cumulative pressure substantially reaches the pre-defined threshold prior to the expiration of the pre-defined duration.

Therefore, if the cumulative pressure substantially reaches the predefined threshold, or approximates the pre-defined threshold within acceptable limits, upon or prior to expiration of the predefined test duration, the controller 228 may designate the emergency steering pump system 200, and more particularly, the secondary pump 122 of the emergency steering pump system 200 as operational and ready to at least temporarily support the load demand in the event of a failure in the primary pump 120. Furthermore, if the emergency steering pump system 200 is determined to be operational, the controller 228 may proceed to normal machine operations.

If, however, the cumulative pressure is less than or does not sufficiently approximate the predefined threshold upon expiration of the predefined test duration, the controller 228 may designate the emergency steering pump system 200, and more particularly, the secondary pump 122 of the emergency steering pump system as inoperative or not ready.

Additionally or optionally, the controller 228 may signal or provide indications of the successful test, for instance, to an operator of the work machine 100 via any one or more interfaces that are disposed in relation to the work machine 100. Alternatively, if the emergency steering pump system 200 is determined to be inoperative or deficient in any manner, the controller 228 may signal or provide indications informing or warning the operator of the failed test prior to proceeding with normal machine operations.

A person of ordinary skill in the art will appreciate that the configurations shown in the accompanied figures depict example configurations. Other arrangements or configurations of the primary pump 120 and the secondary pump 122 may be employed. It should be understood that the secondary pump 122 may be provided as a backup power source in the event that the primary pump 120 may experience a failure, such as deactivated, defected, damaged, or otherwise inoperable. As currently configured, the operational health or readiness of the secondary pump 122 and/or the over-arching emergency steering pump system 200 may be determined, for example, automatically upon startup of the work machine 100, at periodic intervals, or manually upon user request, and the like. Moreover, the operational readiness tests may be initiated once the controller 228 first confirms that the power source or engine 102 is operating and the relevant steering valves 124 of the steering system 106 are closed.

With reference to the embodiment of FIG. 3, the secondary output line 216 is coupled to the primary output line 214 at a point upstream of the load sense line 208. Moreover, as shown, the first spring-loaded check valve 202 is disposed in the primary output line 214 and located at a point on the primary output line 214 upstream of the secondary output line 216. In this embodiment, it has been envisioned that the first orifice 218 and the pressure control mechanism 210 are configured to co-operatively bring about the margin pressure from the secondary pump 122.

Referring to the embodiment of FIG. 4, the pressure control mechanism 210-2 comprises an input 222 that is disposed in the communication line 220 and fluidly coupled to the secondary output line 216 at a point located downstream of the unloader valve 212 of the secondary pump 122. Moreover, the input 222 of the pressure control mechanism 210-2 is provided with a second orifice 230. In this embodiment, it has been envisioned that a setting of the unloader valve 212 associated with the secondary pump 122 is selected to provide the margin pressure relative to the setting on the primary pump 120.

INDUSTRIAL APPLICABILITY

Work machines can be provided with a secondary source of pressurized fluid or secondary pump either as standard equipment or as optional attachments to meet local regulations and/or customer preferences. The secondary pump may serve as a backup steering power source in the event that the primary source of pressurized fluid or primary pump experiences failure. In the instance of using a secondary pump, such as an unloader-type pump driven by an electric motor, additional regulations may require an ability to test the functionality of the emergency steering pump system, or the combined primary pump and secondary pump, and communicate an indication of an appropriate status to the operator, based on whether certain predetermined test thresholds are achieved. The present disclosure serves to provide such features in a manner which minimizes design complexity and the overall costs of implementation and maintenance. Moreover, the present disclosure provides means to quickly and adequately accumulate and maintain pressure within an emergency steering pump system during an operational readiness test while reducing wear to the associated backup or secondary pump.

Figure 5:
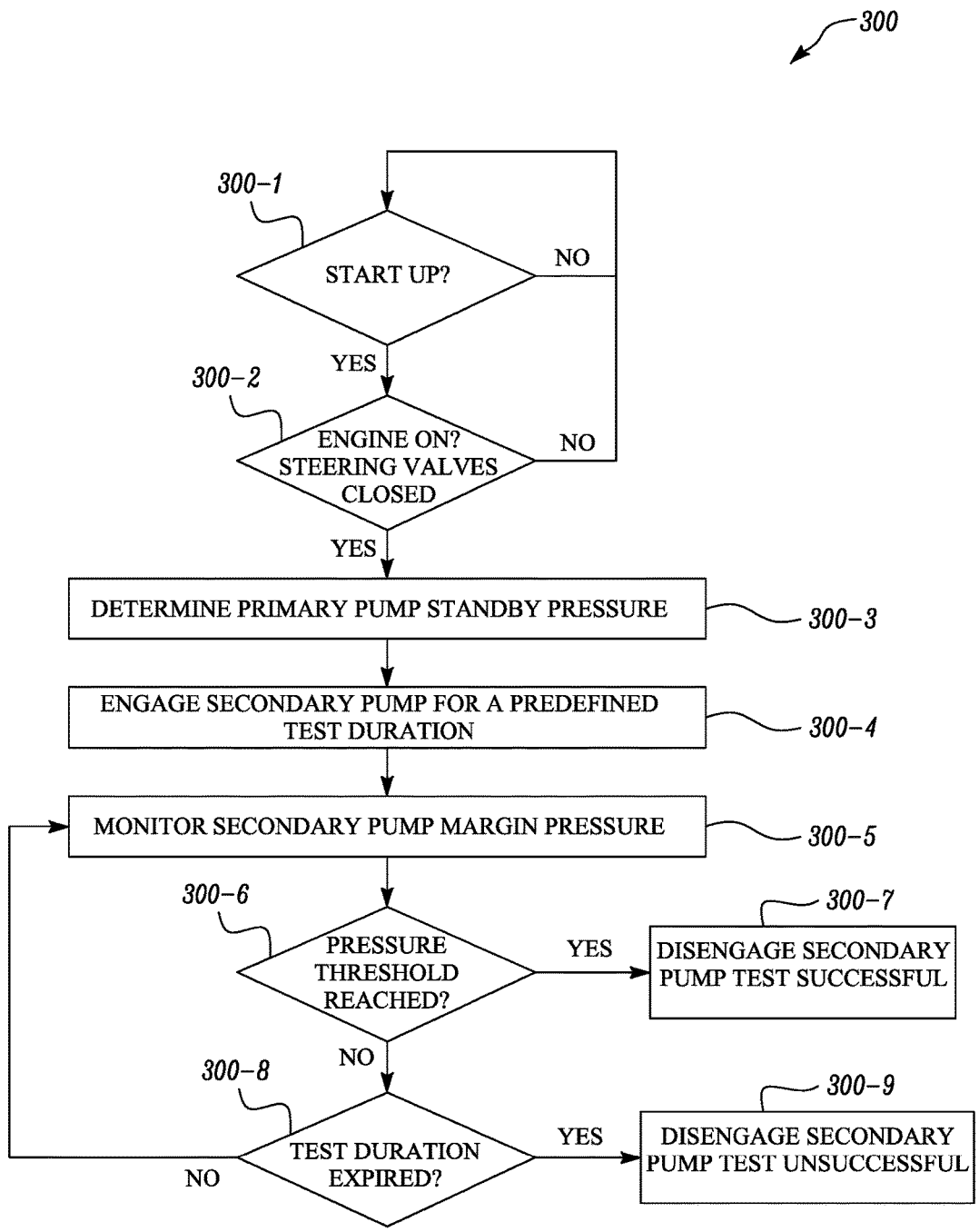
FIG. 5 is a diagrammatic view of one embodiment of an algorithm or method of determining the operational readiness of the emergency steering pump systems of FIG. 2.

Referring now to FIG. 5, an exemplary method 300 for operating the controller 228 associated with the emergency steering pump system 200 of FIG. 2 is diagrammatically provided. For example, the method 300 of FIG. 5 may be used to operate the emergency steering pump system 200 of FIG. 2 which employ a resolver 210-1, or the like and supplies an output pressure that is dependent on primary standby pressure. It may be noted that a similar manner of operation may be implemented with the controllers 216 associated with the emergency steering pump systems 200 of FIGS. 3-4.

According to the method 300 of FIG. 5, the controller 228 in step 300-1 may initially standby for a startup condition which automatically triggers a health check routine to be performed on the emergency steering pump system 200 of FIG. 2. In particular, the startup condition may correspond to the initial startup or engagement of the associated work machine 200, the associated power source or engine 102 of the work machine 200, or any other machine component that is operatively linked to the steering system 106. In other modifications, the controller 228 may be configured to automatically initiate the health check routine at predefined periodic intervals, in which case the controller 228 in step 300-1 may additionally or alternatively standby for the next scheduled testing period. In still further alternatives, the controller 228 in step 300-1 may standby for any manually triggered instructions to conduct a health check routine which may be performed in addition to or in place of the routine automatically performed upon startup.

Once a startup condition or an otherwise sufficient triggering event is detected, the controller 228 in step 300-2 may first ensure that all machine parameters satisfy prerequisite conditions prior to proceeding with the health check or operational readiness test. In accordance with the method 300 of FIG. 5, for example, the controller 228 may be configured to determine whether the associated power source or engine 102 is operating, and whether the relevant hydraulic valves 124 of the steering system 106 are enabled or closed. If the power source or engine 102 is determined to be off, or if all relevant steering valves 124 are not yet closed, the controller 228 may return to step 300-1 and remain in standby until all prerequisite conditions are satisfied. In alternative embodiments, the controller 228 may be configured to detect for other machine parameters during step 300-2 which may be necessary for optimum testing. In other alternatives, the controller 228 may be configured to perform step 300-2 in conjunction with the standby step of 300-1.

If all prerequisite conditions are satisfied in step 300-2, for example, if the engine 102 is confirmed to be operating and the steering valves 124 are confirmed to be closed, the controller 228 may proceed to determine or monitor the standby pressure provided by the primary pump 120 in step 300-3. The controller 228 may observe the standby pressure via any one or more pressure sensors 214 that are dedicated to or otherwise associated with the primary pump 120. In step 300-4, the controller 228 may be configured to engage the secondary pump 122 for a predefined test duration. For example, in an unloader-type secondary pump 122 that is driven by an electric motor 126, the controller 228 may engage the electric motor 126 for a duration that has been preprogrammed within the controller 228. Once the secondary pump 122 is operating, the controller 228 may monitor the margin pressure provided by the secondary pump 122 in step 300-5, in essence, by monitoring the cumulative pressure provided by the emergency steering pump system 200. In particular, the controller 228 may be configured to obtain the cumulative pressure via one or more pressure sensors for example, the first and second pressure sensors 214 that are configured in conjunction with the resolver 210-1 of FIG. 2 to detect the combination of both the standby pressure provided by the primary pump 120 and the margin pressure provided by the secondary pump 122.

Based on such pressure measurements and/or calculations, the controller 228 may be configured to, either by way of the margin pressure or by way of the cumulative pressure, determine if a predefined pressure threshold has been reached in step 300-6. More specifically, the pressure threshold may be a preprogrammed value which corresponds to the anticipated or detected load demand for a given steering input. If the detected margin pressure provided by the secondary pump 122 is sufficient to provide a cumulative pressure which substantially meets the given load demand or the corresponding pressure threshold, the controller 228 may be configured to disengage the secondary pump 122 and designate a successful health check in step 300-7 irrespective of the time remaining in the test duration. If, however, the cumulative pressure for a given iteration is sufficiently less than the predefined pressure threshold by more than an allowed deviation, the controller 228 may proceed to step 300-8 to determine whether the test duration has expired.

If the predefined test duration has not yet expired and time remains in the health check routine, the controller 228 may be configured to return to steps 300-5 and 300-6 and continue monitoring the cumulative pressure in relation to the pressure threshold. Moreover, the controller 228 may repeat such cycle either until the cumulative pressure substantially reaches the predefined threshold, or until the test duration expires, whichever event occurs first. If the cumulative pressure substantially reaches the predefined threshold before the test duration expires, the controller 228 may disengage the secondary pump 122 and designate a successful health check, as described in accordance with step 300-7 above. If the test duration expires before the cumulative pressure reaches the pressure threshold, the controller 228 may disengage the secondary pump 122 and designate the health check as unsuccessful in step 300-9. In further modifications, the controller 228 may additionally signal, alert or otherwise provide indications corresponding to passed and/or failed health check results to an operator of the associated work machine 100.

From the foregoing, it will be appreciated that while only certain embodiments have been set forth for the purposes of illustration, alternatives and modifications will be apparent from the above description to those skilled in the art. These and other alternatives are considered equivalents and within the spirit and scope of this disclosure and the appended claims.

What is claimed is:

1. An emergency steering pump system for a primary pump providing a standby pressure via a primary output line, the emergency steering pump system comprising:
   a load sense line configured to branch-off from a point located partway along a length of the primary output line,
      the load sense line having a first orifice disposed therein;
   a secondary pump for providing a margin pressure,
      the secondary pump having a secondary output line coupled to the primary output line at a point downstream of the load sense line;
   a communication line coupled to the primary output line at a point upstream of the load sense line,
      the communication line having a pressure control mechanism disposed therein,
         wherein an output of the pressure control mechanism is coupled with an unloader valve of the secondary pump such that the pressure control mechanism is configured to bring about the margin pressure from the secondary pump; and
   a spring-loaded check valve disposed in the load sense line and located at a point in the load sense line downstream of the first orifice.

2. The emergency steering pump system of claim 1, wherein the pressure control mechanism includes a resolver.

3. The emergency steering pump system of claim 1, further comprising a variable spring-loaded relief valve disposed between a point upstream of the primary pump and the output of the pressure control mechanism.

4. The emergency steering pump system of claim 1, further comprising a first spring-loaded check valve disposed in the primary output line and located at a point on the primary output line downstream of the load sense line,
the first spring-loaded check valve being configured to selectively allow a unidirectional flow of fluid from the primary pump via the primary output line.

5. The emergency steering pump system of claim 4, further comprising:
a first pressure sensor disposed in the primary output line and located at a point in the primary output line upstream of the load sense line and the first spring-loaded check valve,
the first pressure sensor being configured to measure the standby pressure being output by the primary pump;
a second pressure sensor disposed in the primary output line and located at a point in the primary output line downstream of the secondary output line,
the second pressure sensor being configured to measure at least one of the primary pump pressure and the secondary pump pressure; and
a controller disposed in communication with each of the first pressure sensor and the second pressure sensor,
the controller, upon start-up, being configured to:
engage the secondary pump for a pre-defined duration,
monitor a cumulative pressure of the standby pressure and the margin pressure, and
determine readiness of the secondary pump based on the cumulative pressure as compared to a pre-defined threshold,
wherein the controller designates the readiness of the secondary pump as successful if the cumulative pressure substantially reaches the pre-defined threshold prior to an expiration of the pre-defined duration.

6. The emergency steering pump system of claim 1, further comprising a second spring-loaded check valve disposed in the secondary output line,
the second spring-loaded check valve being configured to selectively allow a unidirectional flow of fluid from the secondary pump via the secondary output line.

7. The emergency steering pump system of claim 1, where the spring-loaded check valve is configured to selectively allow a unidirectional flow of fluid from the primary output line to the communication line via the load sense line.

8. An emergency steering pump system for a primary pump providing a standby pressure via a primary output line, the emergency steering pump system comprising:
a load sense line configured to branch-off from a point located partway along a length of the primary output line,
the load sense line having a first orifice disposed therein;
a secondary pump for providing a margin pressure,
the secondary pump having a secondary output line coupled to the primary output line at a point upstream of the load sense line;
a communication line coupled to the primary output line at a point upstream of the load sense line,
the communication line having a pressure control mechanism disposed therein such that an output of the pressure control mechanism is coupled with an unloader valve of the secondary pump,
wherein the first orifice and the pressure control mechanism are configured to co-operatively bring about the margin pressure from the secondary pump; and
a first pressure sensor disposed in the primary output line,
the first pressure sensor being configured to measure the standby pressure; and
a second pressure sensor disposed in the primary output line and located at a point in the primary output line downstream of the load sense line.

9. The emergency steering pump system of claim 8, wherein the pressure control mechanism includes a resolver.

10. The emergency steering pump system of claim 8, further comprising a variable spring-loaded relief valve disposed between a point upstream of the primary pump and the output of the pressure control mechanism.

11. The emergency steering pump system of claim 8, further comprising a first spring-loaded check valve disposed in the primary output line and located at a point on the primary output line upstream of the secondary output line,
the first spring-loaded check valve being configured to selectively allow a unidirectional flow of fluid from the primary pump via the primary output line.

12. The emergency steering pump system of claim 11, further comprising a second spring-loaded check valve disposed in the secondary output line,
the second spring-loaded check valve being configured to selectively allow a unidirectional flow of fluid from the secondary pump via the secondary output line.

13. The emergency steering pump system of claim 8, further comprising:
a controller disposed in communication with each of the first pressure sensor and the second pressure sensor,
the controller, upon start-up, being configured to:
engage the secondary pump for a pre-defined duration,
monitor a cumulative pressure of the standby pressure and the margin pressure, and
determine readiness of the secondary pump based on the cumulative pressure as compared to a pre-defined threshold,
wherein the controller designates the readiness of the secondary pump as successful if the cumulative pressure substantially reaches the pre-defined threshold prior to an expiration of the pre-defined duration.

14. An emergency steering pump system for a primary pump providing a standby pressure via a primary output line, the emergency steering pump system comprising:
a load sense line configured to branch-off from a point located partway along a length of the primary output line,
the load sense line having a first orifice disposed therein;
a secondary pump for providing a margin pressure,
the secondary pump having a secondary output line coupled to the primary output line at a point downstream of the load sense line;
a communication line coupled to the load sense line,
the communication line having a pressure control mechanism disposed therein such that an input of the pressure control mechanism is fluidly coupled to the secondary output line at a point located downstream of an unloader valve associated with the secondary pump, and the input of the pressure control mechanism being provided with a second orifice such that the second orifice facilitates the pressure control mechanism to co-operate with the first and second orifices for bringing about the margin pressure from the secondary pump,
- wherein a setting of the unloader valve associated with the secondary pump is selected to provide the margin pressure relative to the setting on the primary pump; and a controller that, upon start-up, in configured to engage the secondary pump, monitor a cumulative pressure of the standby pressure and the margin pressure, and determine a readiness of the secondary pump based on the cumulative pressure as compared to a threshold.

15. The emergency steering pump system of claim 14, further comprising:
a first spring-loaded check valve disposed in the primary output line and located at a point on the primary output line downstream of the load sense line,
- the first spring-loaded check valve being configured to selectively allow a unidirectional flow of fluid from the primary pump via the primary output line;

a second spring-loaded check valve disposed in the secondary output line,
- the second spring-loaded check valve being configured to selectively allow a unidirectional flow of fluid from the secondary pump via the secondary output line; and a third spring-loaded check valve disposed in the load sense line and located at a point in the load sense line downstream of the first orifice and upstream of the communication line,
- the third spring-loaded check valve being configured to selectively allow a unidirectional flow of fluid from the primary output line to the load sense line.

16. The emergency steering pump system of claim 15, wherein the pressure control mechanism includes a fourth spring-loaded check valve.

17. The emergency steering pump system of claim 15, further comprising:
a first pressure sensor disposed in the primary output line and located at a point in the primary output line upstream of the load sense line and the first check valve,
- the first pressure sensor being configured to measure the standby pressure being output by the primary pump; and a second pressure sensor disposed in the primary output line and located at a point in the primary output line downstream of the secondary output line,
- the second pressure sensor being configured to measure at least one of the primary pump pressure and the secondary pump pressure.

18. The emergency steering pump system of claim 14, further comprising a variable spring-loaded relief valve disposed between a point upstream of the primary pump and the input of the pressure control mechanism.

19. The emergency steering pump system of claim 14, where the controller is disposed in communication with a first pressure sensor and a second pressure sensor.

20. The emergency steering pump system of claim 14, where the controller designates the readiness of the secondary pump as successful when the cumulative pressure substantially reaches the threshold prior to an expiration of a particular duration.

* * * * *